Figures 1, 2:
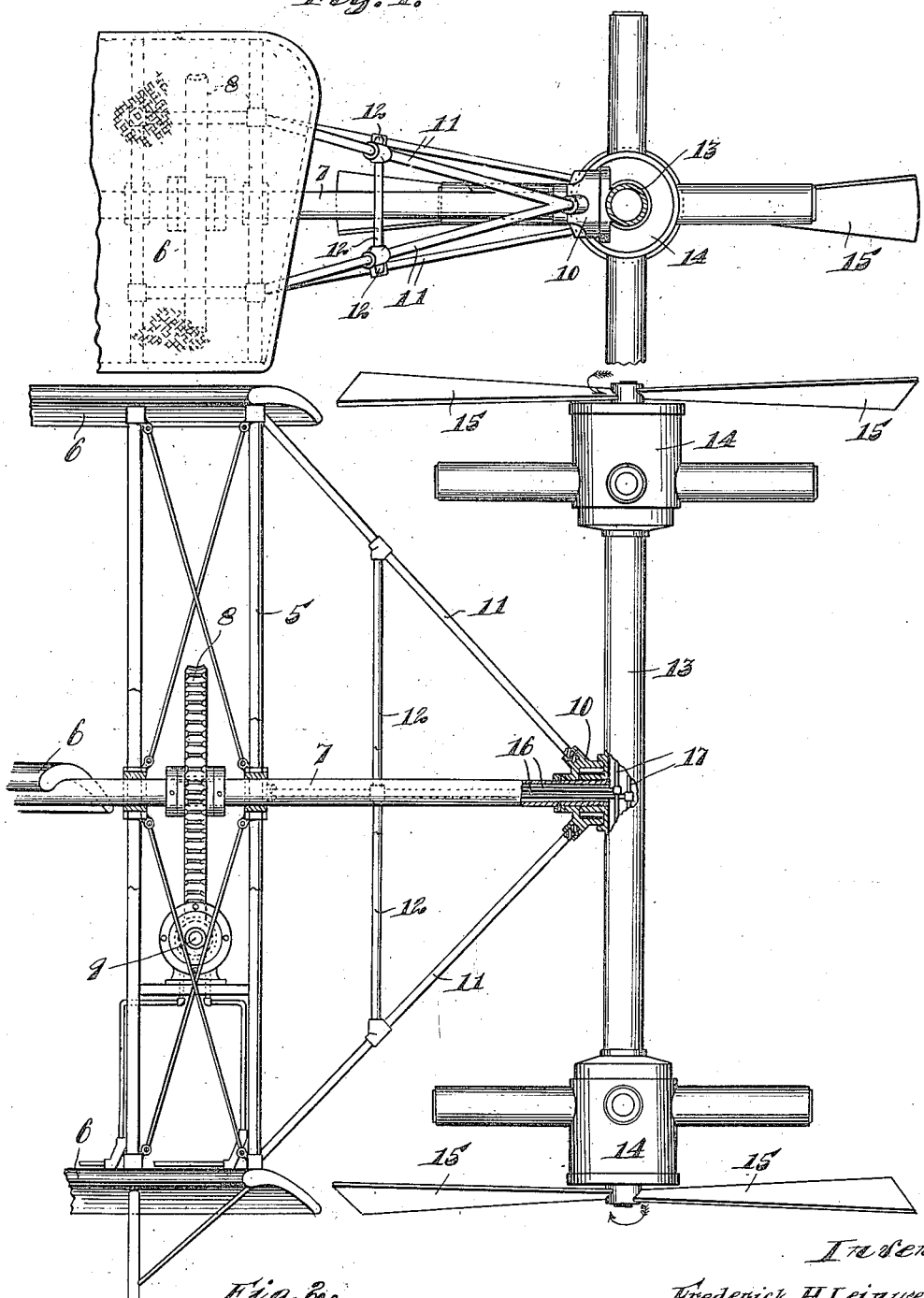

F. H. LEINWEBER, DEC'D.
C. H., W. H & V. H. LEINWEBER, EXECUTORS.
AIRSHIP.
APPLICATION FILED MAY 5, 1917.

1,288,936. Patented Dec. 24, 1918.
2 SHEETS—SHEET 1.

Witnesses:
C. E. Wessels
B. J. Richards

Inventor
Frederick H. Leinweber,
By Joshua R. H. Potts
his Attorney.

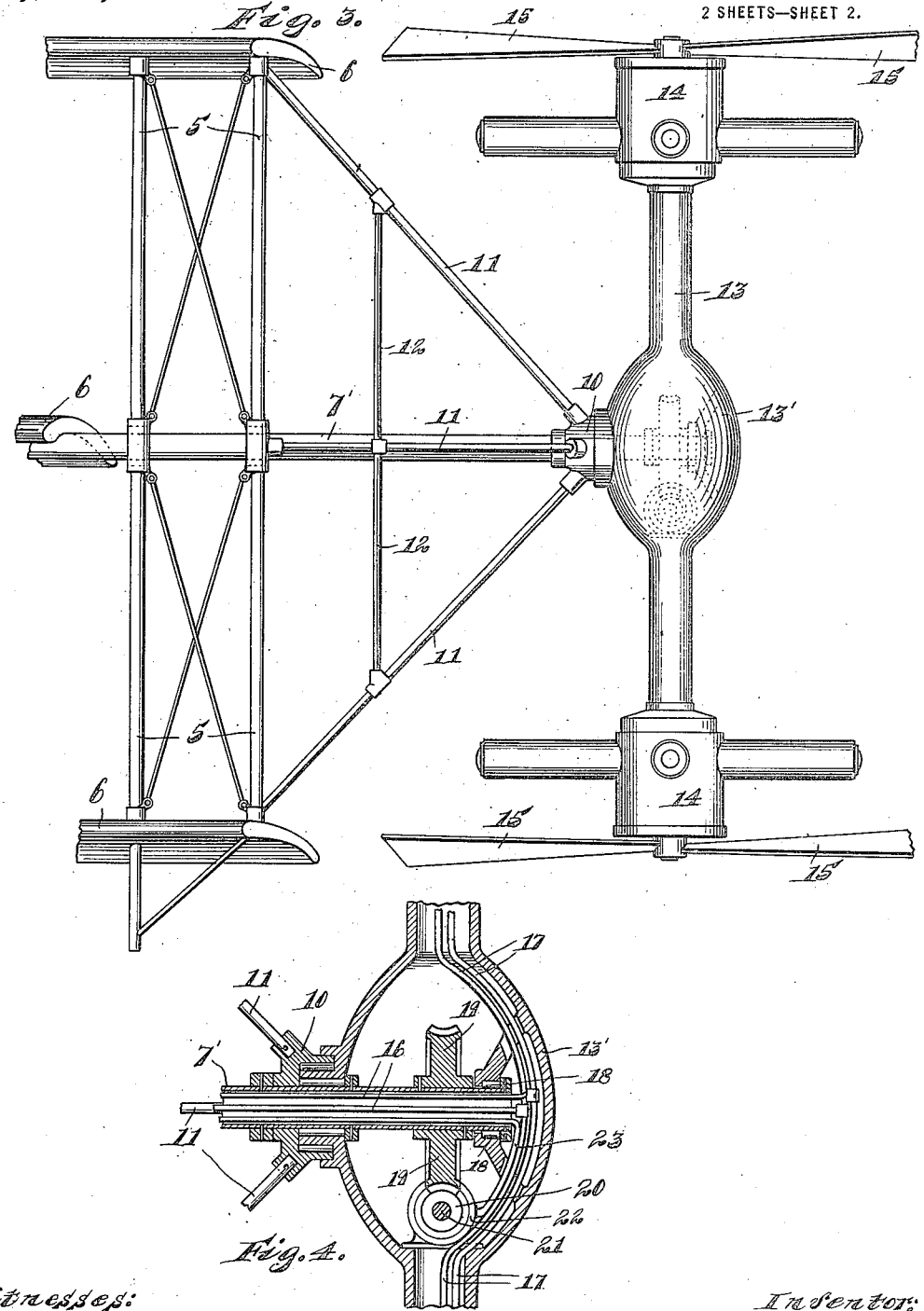

UNITED STATES PATENT OFFICE.

FREDERICK H. LEINWEBER, OF CHICAGO, ILLINOIS; CURTIS H. LEINWEBER, WILLIAM H. LEINWEBER, AND VICTOR H. LEINWEBER EXECUTORS OF SAID FREDERICK H. LEINWEBER, DECEASED.

AIRSHIP.

1,288,936. Specification of Letters Patent. Patented Dec. 24, 1918.

Application filed May 5, 1917. Serial No. 166,615.

*To all whom it may concern:*

Be it known that I, FREDERICK H. LEINWEBER, a citizen of the United States, and a resident of the city of Chicago, county of Cook, and State of Illinois, have invented certain new and useful Improvements in Airships, of which the following is a specification.

My invention relates to improvements in airships and has for its object the provision of an improved propeller mounting therefor.

The invention consists in the combinations and arrangements of parts hereinafter described and claimed.

The invention will be best understood by reference to the accompanying drawings forming a part of this specification, and in which, Figure 1 is a top plan view of a propeller mounting embodying my invention, Fig. 2, an end view of the same shown partially in section, Fig. 3, an end view of a modified form of construction, and Fig. 4, a detail section of the same.

The form of construction illustrated in Figs. 1 and 2 comprises an airship or aeroplane frame construction 5 of any usual or desired construction and having supporting planes 6 mounted therein as indicated. Embodied in the airship frame is a hollow shaft 7 having a worm wheel 8 thereon meshing with a worm on an operating shaft 9 by means of which shaft 7 may be rotated or oscillated when desired.

A bearing member 10 is provided at the outer end of shaft 7 and is connected by vertical lateral braces 11 with the body or frame of the airship, struts 12 connecting said braces.

A tubular propeller mounting member 13 is secured centrally to the outer end of shaft 7 to project at substantially right angles thereto. The member 13 carries suitable engines 14 and propellers 15 as shown. Pipes 16 are extended through the shaft 7 and connected with branch pipes 17 in the member 13 and leading to the engines 14 whereby said engines are provided with fuel. By this arrangement, it will be observed that the member 13 may be readily adjusted to different angular relations with respect to the body of the airship and is thoroughly braced thereon.

In the form of construction illustrated in Figs. 3 and 4, the hollow shaft 7 is dispensed with and a stationary tube 7' substituted therefor. The propeller mounting member 13 is provided with an enlarged central hub 13' having a bearing on the bearing block 10 and a bearing 18 on the outer end of tube 7'. The worm wheel 19 is arranged in hub 13' on tube 7' and meshes with a worm 20 on a shaft 21 driven by a motor 22 of any suitable or desired construction. Motor 22 is provided with compressed air or other motive fluid through a tube or pipe 23 as indicated. In this instance the pipes 16 connect with the branch pipes 17 which are arranged as indicated. This arrangement furnishes a simple and efficient mounting for the propellers and in which the working parts are inclosed and protected.

While I have illustrated and described the preferred forms of construction for carrying my invention into effect, these are capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. The combination with an airship body of a hollow member protruding therefrom; a hollow propeller mounting mounted centrally on the outer end of said hollow member extending at substantially right angles thereto; a propeller at each end of said mounting; a motor at each end of said mounting operatively connected with the corresponding propeller; and pipes leading through said member and said mounting to said motors, substantially as described.

2. The combination with an airship body of a hollow member protruding therefrom; a hollow propeller mounting mounted centrally on the outer end of said hollow member extending at substantially right angles thereto; a propeller at each end of said mounting; a motor at each end of said mounting operatively connected with the corresponding propeller; pipes leading through said member and said mounting to said motors; and braces extending vertically from the outer end of said member to said body, substantially as described.

In testimony whereof I have signed my name to this specification in the presence of two subscribing witnesses.

FREDERICK H. LEINWEBER.

Witnesses:
  JOSHUA R. H. POTTS,
  HELEN F. LILLIS.